Feb. 27, 1968     J. B. ROMAN     3,370,857
DUST GUARD AND LUBRICANT SEAL FOR RAILROAD JOURNAL BOXES
Filed April 26, 1965
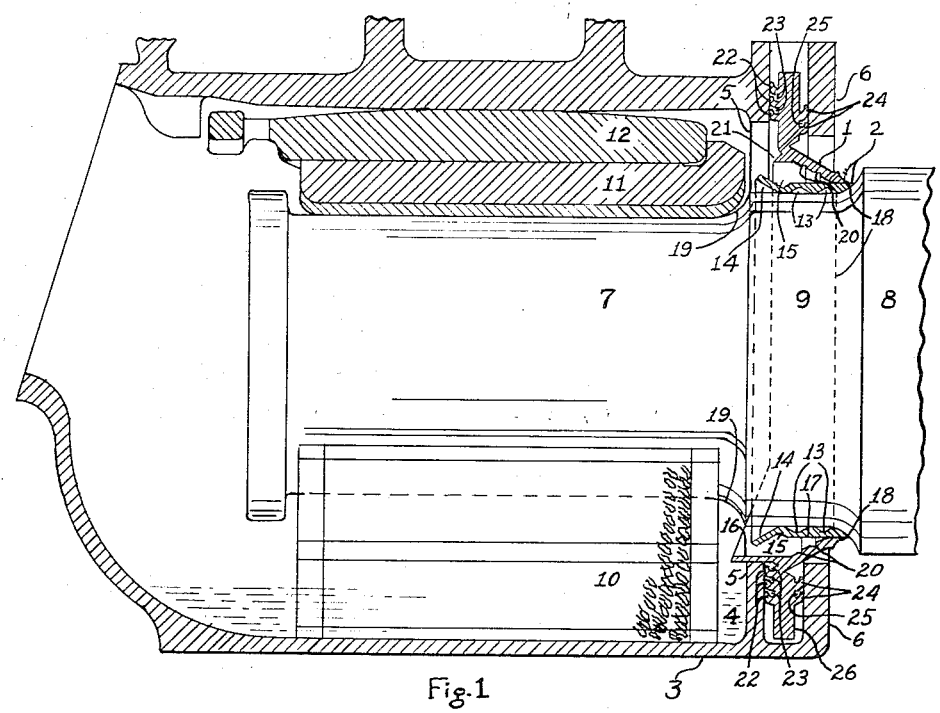
Fig.1
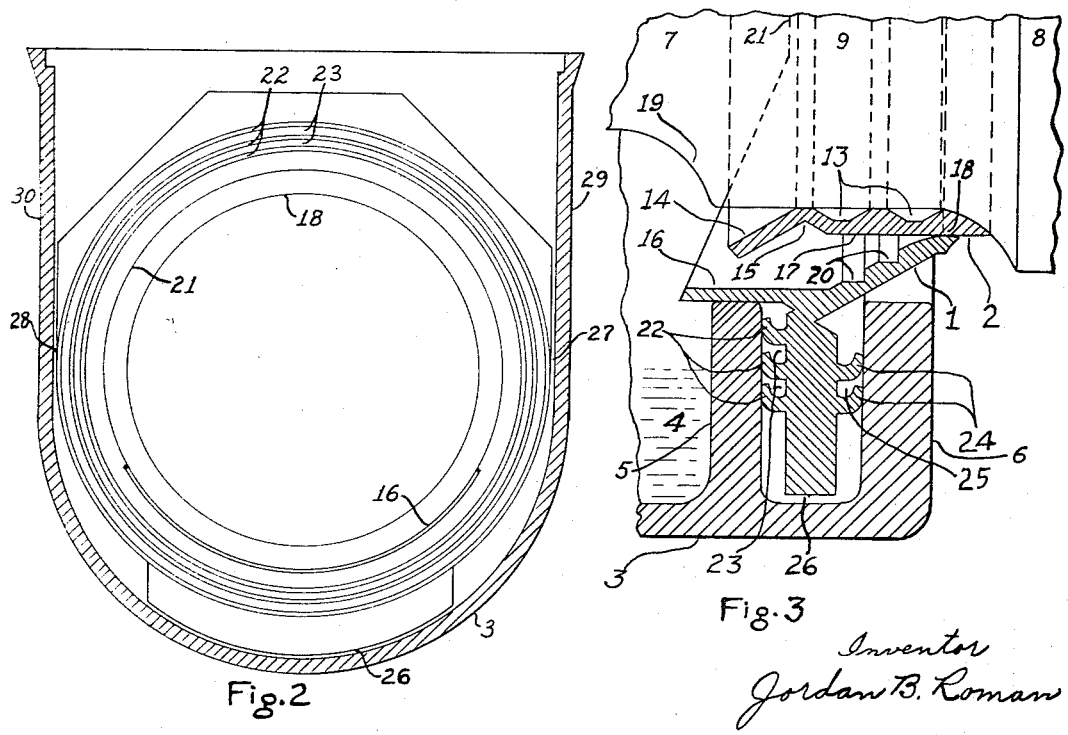
Fig.2
Fig.3
Inventor
Jordan B. Roman

# United States Patent Office 3,370,857
Patented Feb. 27, 1968

3,370,857
DUST GUARD AND LUBRICANT SEAL FOR
RAILROAD JOURNAL BOXES
Jordan Brown Roman, 1011 8th St.,
Huntington, W. Va. 25701
Filed Apr. 26, 1965, Ser. No. 450,789
5 Claims. (Cl. 277—130)

This invention relates in particular to a means for providing a seal at the inner or wheel end of a railroad freight car axle journal box. The object of this invention is to provide a seal which will retain the lubricant in the axle journal box and exclude moisture, dirt and all other foreign matter from it by effectively sealing around the axle and at the opening through which the axle is inserted in the journal box and at the opening at the top of the dust guard cavity.

Many seals have been introduced to the railroad industry which attempted to effect a sealing means in the area to which this invention relates but they have not been adopted for general use because they were either not effective sufficiently long to be practical, inadequately designed, or too expensive to be commercially acceptable. There are many unusual and adverse conditions under which the sealing means must function such as severe changes in weather conditions, wind-driven sand, grit, water, etc., abusive shocks and impacts which are continually occurring in the operation of railway car trucks. There are many features to this sealing problem which must be satisfied. The seal must have a long, trouble-free operating life and must positively exclude water and grit, have a minimum of friction and torque loss so as not to add to the heat generated in ordinary operation, be equally effective at both low and high temperatures, positively retain the lubricant, be easily installed and yet firmly positioned in place in a fluid-tight manner as well as one which will withstand abusive operating shocks and rough handling by service crews.

This invention provides a seal with a number of novel and unique features which will accomplish the sealing effect long searched for and will overcome a problem which has long vexed the railroad industry.

The primary object of this invention is to provide a single shaft type seal which will exclude foreign matter from and retain lubricant within a shaft and housing assembly wherein the axle shaft may and usually is exposed to multi-directional axial movement.

Another object is to provide a novel sealing arrangement at the inner and outer dust guard cavity walls of the axle journal box assembly consisting of a series of circular or other shape resilient extensions which seal by penetrating all the cast wall surface irregularities and by forming a series of valleys or recesses between the ridges or extensions which act as lubricant basins and pressure reducers.

Yet another object is to provide an effective lubricant-sealing and wiping, vertically situated, lip so located, at the end of an inboard-extending circular shroud with annular recesses on its inside sloping wall which facilitate the application of the seal into the dust guard cavity and also obstruct the movement of the lubricant in the direction of the sealing and wiping lip of the seal, that it will remain effective and intact in spite of any and all the possible multi-directional movements of the axle and related journal assembly parts.

A further object is the provision of a sloping ledge or extension, encompassing the top 240° of the circular inner inside diameter edge of the seal shroud to direct any lubricant which gathers on it to small interrupting grooves at either end of this 240° extension and the interrupting grooves in turn redirect the lubricant to a collecting shelf formed as an adjunct to the extension and encompassing the remaining 120° of the circle and extending sufficiently in length to carry the lubricant collected the necessary distance so that the lubricant will drain back into the journal box lubricant reservoir.

An important and necessary feature of an effective journal box sealing device is to keep the sealing lip or sealing means concentric with the dust guard seat of the axle and the longitudinal center line of the axle and it is a specific object of this invention to effect this result by designing the sides and bottom of the seal to contact the bottom and edges, or side walls, of the dust guard cavity and thus automatically centralize the sealing and wiping lip of the seal.

Yet another object is to provide a seal with the aforementioned shroud and annular recesses on its inside sloping wall which in addition to facilitating the application of the seal into the dust guard cavity will permit the shroud to flex with vertical, horizontal and lateral movement of the axle and will allow it to infold like a diaphragm when small lateral movements of the axle take place and thus reduce the amount of lateral sliding movement of the seal lip upon the axle surface, a feature which reduces wear of the sealing lip and prolongs its life and diminishes the amount of lubricant which can possibly be wiped off to the outside and lost.

A further object of this invention is to provide an elastomeric ring which grippingly fits the dust guard seat of the axle with its outside diameter surface giving a smooth seat, albeit the axle dust guard seat has not been carefully finish-machined, for the sealing and wiping lip of the dust guard and lubricant seal to work on, the elastomeric ring having at its inside diameter and axle dust guard-containing surface thin circular offsets and grooves to seal in any lubricant which is moving from the axle journal toward the outside of the journal box or any lubricant which may be sloshed to the rear of the journal box due to operating impacts, shocks or lateral movements of the axle which compress the journal lubricator and squeeze lubricant to the rear of the journal box.

Still another feature is incorporated in this invention, a flared circular extension at the inner end of the elastomeric ring have a tractable slope which does not interfere with its application, when mounted on the axle, through the dirt and lubricant seal and located specifically in an area sufficiently inboard to prevent the flared extension from being damaged due to contact with the axle journal bearing or other parts of the journal box assembly and whose object is to obstruct the movement of lubricant to the sealing and wiping lip of the seal by forming a recess, dam and alcove which reverses the lubricant flow and, when rotating with the axle, disperses the lubricant in a radial direction to the walls of the journal box where some of it will drip down to the top of the journal lubricator to improve the lubricating action of the journal box assembly and disperses some of the lubricant to the seal shroud from which part of it drips to the outer surface of the elastomeric ring which has a groove or channel just behind the flared end whose object is to capture the lubricant and guide it away from the sealing and wiping lip of the lubricant seal to the collecting shelf, mentioned above, and thence to the journal box lubricant reservoir, and the other part of the lubricant flows off the recesses or offsets, which are more in the nature of a shelf when disposed in the lower half of their vertical plane, down to the collecting shelf and also into the journal box lubricant reservoir.

The features and advantages of this invention will become more clear from the following detailed specification of an illustrated embodiment taken in connection with the accompanying drawings wherein:

FIGURE 1 is a longitudinal view through a railway truck journal box assembly equipped with the invention which is the sealing elements shown in a cross-sectional view in elevation illustrating the position of the lubricant seal in the dust guard cavity of the railroad car journal box and the relative position of the co-functioning elastomeric ring in its location around the dust guard seat section of the railway car axle.

FIGURE 2 is a view of the seal, with the elastomeric ring omitted for clarity, as viewed from the rear of the journal box assembly shown in FIGURE 1 just inside the outer dust guard cavity wall.

FIGURE 3 is an enlarged fragmentary view of a section depicting the sealing element in the lower portion of the dust guard cavity and the relative position of the seal lip with relation to the co-functioning elastomeric ring element surrounding the axle dust guard seat area.

As herein illustrated the seal element 1 is applied through an opening in the top of the dust guard cavity, comprised of inner wall 5, outer wall 6, and side walls 29 and 30 at the rear end of a railroad car journal box 3 in which are located the conventional wedge 12, plain bearing 13, journal lubricator 10 and lubricant in reservoir 4 all of which in combination provide the freight car load-transferring means and lubricating means for the axle journal 7 which works within the journal box 3 and is the prolongation of the larger diameter axle dust guard section 9 which itself is slightly smaller in diameter than the axle 8 section on which the railroad car wheel is mounted. The seal element 1 is made of neoprene or other synthetic rubber or elastomeric compound and the sealing lip 18, an annular edge which seals the lubricant, is so disposed inboardly that even the most extreme inboard lateral motion of the axle 8 will not be sufficient to cause the sealing lip 18 to drop down at the axle fillet 19 and lose its sealing effect and possibly damage seal 1 when the lateral motion reverses. The diameter of the seal 1 at the sealing lip 18 is smaller than the diameter at seat 17 of the elastomeric ring, to be described, on which it rides so that the combination of resilient sealing lip material and small diameter keeps the sealing lip 18 continuously effective in sealing in the lubricant which may get to surface 17. The sealing lip 18 seals in the lubricant and also acts as a wiper to cause the lubricant to drain off surface 17 and move back to the journal box lubricant reservoir 4. Another important feature of the invention are the two offsets or recesses 20 in the conical shroud extending from sealing lip 18 to the main vertical portion of seal element 1 and which perform two functions, one to aid in flexing the seal 1 for insertion into the dust guard cavity, previously described, and two, to cause the lubricant to drop down on surface 17, where it can be wiped to channel 15, to be described, or to flow down to ledge 16, to be described, and then to the journal box lubricant reservoir 4. This second function deters the lubricant from moving to the sealing lip 18 where minute amounts of lubricant might pass through to the exterior of the journal box 3 and be lost. Extension or sloping ledge 21 is a projection at the inner inside diameter edge and at the top end of the seal shroud, encompassing 240° of the part of a circle and terminating at each end with small interrupting grooves which redirect any lubricant flowing down ledge 21 to collecting shelf 16 formed as an adjunct to it and encompassing the remaining 120° of the circle. Shelf 16 is a projection which is sufficiently long to overhang the inner wall 5 of the dust guard cavity so that all lubricant which it captures will flow directly into the journal box reservoir 4. Three protruding, thin, flexible and resilient circular ridges 22 extending from the main body of seal element 1 bear against the inner dust guard cavity wall 5 and, together with the two contiguous grooves 23 which ridges 22 form, act as a lubricant seal at inner wall 5 by filling all of its irregularities and two protruding, thin, flexible and resilient circular ridges 24 extending from the opposite side of the main body of seal element 1 bear against the outer dust guard cavity wall 6 and, together with groove 25 which ridges 24 form, act as a seal to retain lubricant and exclude foreign matter at outer wall 6. This result is obtained by arranging the ridges so that the overall distance between their tips which contact the dust guard cavity walls 5 and 6 is greater than the overall width of the dust guard cavity and the ridges are constrained to be forcefully in contact with the walls whose irregularities the resilient ridge material will fill and seal. Extension 26 of seal 1, designed to contact the bottom of the dust guard cavity, locates the seal 1 so that its sealing lip 18, which forms its annular inner edge, will be on the same horizontal center line as the axle dust guard seat 9 and the two sides 27 and 28 of seal 1, designed to parallel for a distance and to contact the sides 29 and 30 of the dust guard cavity, locate seal 1 so that its sealing lip 18, which forms its annular inner edge, will be on the same vertical center line as the axle dust guard seat 9 and this combination keeps the sealing lip 18 concentric with the outer surface of the elastomeric ring 2 and engagingly in contact with it to effect the lubricant-sealing and wiping desired.

As further illustrated, the seal element 2, a circular elastomeric ring, made by forming in a mold, is applied over the end of the axle by stretching it and moving it to the dust guard seat of the axle. It is made of neoprene or other synthetic rubber or elastomeric compound, which will not be affected by journal box lubricant and which is sufficiently thin, soft, compressible and flexible, so that it will stretch enough to slip it on the dust guard seat 9 of a railroad car axle and then will grip the axle sufficiently tight to remain in position during lateral, vertical and horizontal movements of the axle 8 at all speeds. The gripping is effected by the elasticity of the material and the smaller inside diameter which seal element 2, the elastomeric ring, has in comparison to the diameter of the axle dust guard seat 9. Seal element 2 has at its inside diameter, corrugations 13 which not only favor its application but also act as a labyrinth seal in preventing the lubricant, which rides along the journal 7 and across the axle journal fillet 19, form moving beyond the dust guard seat 9 to the exterior of the journal box 3. The journal box end of seal element 2 is a flared extension 14 which is specifically located so that it will perform its functions even if an axle journal has been lengthened in the course of maintenance and it acts to stop the flow of any lubricant coming to its across the axle fillet 19 by accumulating the lubricant so that the lubricant will flow down to collecting shelf 16 or to the extremity of the flared extension 14 where, due to centrifugal force produced by the rotation of the axle 8 with which extension 14 turns, the lubricant will be thrown to the interior journal box surfaces or against the dust guard cavity seal element 1 from which it will then drip or flow to the journal lubricator or into the journal box lubricant reservoir 4. Just behind the flared extension 14 of seal element 2, there is incorporated a channel 15, previously referred to, and so located that it gathers and guides the lubricant, which drips from the shroud of seal element 1 or is wiped to it by lubricant sealing lip 18, to the collecting shelf 16 which in turn deposits it in lubricant reservoir 4 of the journal box 3. Furthermore, seal element 2 presents a smooth circular surface 17 which is concentric with the axle and axially-extending for the sealing lip 18 to ride on when the axle 8 moves laterally or radially or in any of the multi-directions which it is permitted to move. Supplying such a smooth circular surface 17, by applying seal element 2, obviates the need to machine and roll or polish a worn axle dust guard seat.

From the foregoing description it is evident that sealing element 2 can be arranged with longer internal annular rings extending radially which will take up any space produced as the result of reducing the diameter of the dust guard section 9 of axle 8 whenever a second hand axle may be machined at section 9 to prepare it for further service. It is also evident that sealing element 1 can be arranged to act alone to retain a lubricant within the railroad car axle journal box or any similar shaft and lubricant reservoir arrangement and to exclude dirt, moisture or any other foreign matter from the axle journal box by simply increasing its central portion radially which will move the circular sealing lip closer to the center line of the axle or shaft. It will also be evident that certain changes may be made in the form, construction and arrangement from that disclosed herein without in any way departing from the spirit of the invention or giving up any of the attendant advantages hereof, provided, however, that such changes fall within the scope of the claims which follow.

What is claimed is:

1. A dust guard and lubricant seal made of lubricant-resistant and elastomeric material for use at the dust guard cavity, the rear end of a railroad axle journal box, which seals at the inner wall of the dust guard cavity by virtue of a series of circular projections, with contiguous grooves which they form, long enough, thin enough and compressible and flexible enough to enter and fill all the inner wall irregularities and interstices resulting from imperfect molding and made still more effective by virtue of having at the outer wall of the dust guard cavity additional circular projections or ridges, with contiguous groove which they form, thin enough, compressible and flexible enough and long enough to enter and fill all the outer wall irregularities and interstices resulting from imperfect molding and to cause forceful engagement of these projections or ridges with the inner and outer dust guard cavity wall by virtue of their tip to tip length which exceeds the width or distance between the dust guard cavity walls.

2. A dust guard and lubricant seal made of lubricant-resistant and elasotmeric material for use at the dust guard cavity, the rear end of a railroad axle journal box, with an annular lubricant-sealing and wiping and dirt-excluding lip located in a vertical plane and, specifically, located just outside the outer wall of the journal box dust guard cavity which inhibits its damage due to the lateral (in and out of the journal box) motion of the axle and, from the annular sealing lip extending outwardly in a sloped radial direction, a shroud in which are located two annular recesses on the shroud's inner sloping wall which facilitate the application of the lubricant seal into the journal box dust guard cavity and when in operation obstructs the movement of the lubricant in the direction of the sealing and wiping lip of the lubricant seal and tends to control the flow of the lubricant in the direction of the journal box lubricant reservoir and further facilitate the flexing of the sealing shroud due to vertical, horizontal or lateral movement of the axle and still more allow the infolding of the sealing shroud like a diaphragm when small lateral movements of the axle take place and thus reduce the amount of lateral sliding movement of the seal lip upon the axle surface and diminish wear and, at the inner terminus of the shroud, a sloping ledge or extension, encompassing the top 240° of the shroud terminus, to direct any lubricant which gathers on it to small interrupting grooves at either end of this 240° extension and a lubricant-collecting shelf formed as an adjunct to the sloping ledge and encompassing the remaining 120° of the shroud terminus and of sufficient length to carry the lubricant which it receives the necessary distance for the lubricant to drain directly into the journal box.

3. A dust guard and lubricant seal made of lubricant-resistant and elastomeric material for use at the dust guard cavity, the rear end of a railroad axle journal box, two vertical edges, paralleling for a distance the vertical sides of the journal box dust guard cavity and filling the space between the vertical sides in the vicinity of the horizontal center line of the dust guard cavity wall openings and with an extension at the seal bottom which fills all space to the bottom of the dust guard cavity so that the seal will be located whereby its central circular sealing-lip opening will be on the same horizontal and vertical center lines as the opening in the dust guard cavity walls which makes the seal opening concentric with the axle center line.

4. In combination with a lubricant-retaining and dirt-excluding seal covered by claim 2, an elastomeric circular seal element or ring which by virtue of annular ridges and grooves, smaller in diameter than the axle or shaft surface it surrounds, grippingly fits the dust guard seat of a freight car axle to seal in the lubricant and with its outside surface giving a smooth seat for the sealing and wiping lip of the dust guard and lubricant seal to work on and having a groove or channel just beyond the smooth surface area which captures the lubricant and guides it to a collecting shelf.

5. An elastomeric circular seal element or ring covered by claim 4 having a flared circular extension at its inner end with a tractable slope for ease in application and which is specifically located, by virtue of the ring fit at the axle fillet, in a definite position on the axle dust guard seat so that the action of the axle and the journal box assembly components will not damage it or interfere with its functions which are to obstruct the movement of lubricant to the sealing and wiping lip of its co-functioning seal by collecting the lubricant in the recess which it forms with the axle surface and to reverse the lubricant flow and when rotating with the axle disperse the lubricant in a radial direction to the walls of the journal box.

References Cited

UNITED STATES PATENTS

| | | | |
|---|---|---|---|
| 2,487,669 | 11/1949 | Pattullo et al. | 277—131 |
| 2,692,783 | 10/1954 | Foss | 277—237 X |
| 2,743,947 | 5/1956 | Foss | 277—132 |
| 2,758,853 | 8/1956 | Beck | 277—237 X |
| 2,781,208 | 2/1957 | Foss | 277—237 X |
| 2,959,431 | 11/1960 | Foss | 277—237 X |
| 3,035,843 | 5/1962 | Runknagel | 277—130 |

MARTIN P. SCHWADRON, *Primary Examiner.*

R. R. BUNEVICH, *Assistant Examiner.*